June 27, 1967      J. H. MARTEN      3,328,401
SYNTHESIS OF MELAMINE
Filed May 23, 1966
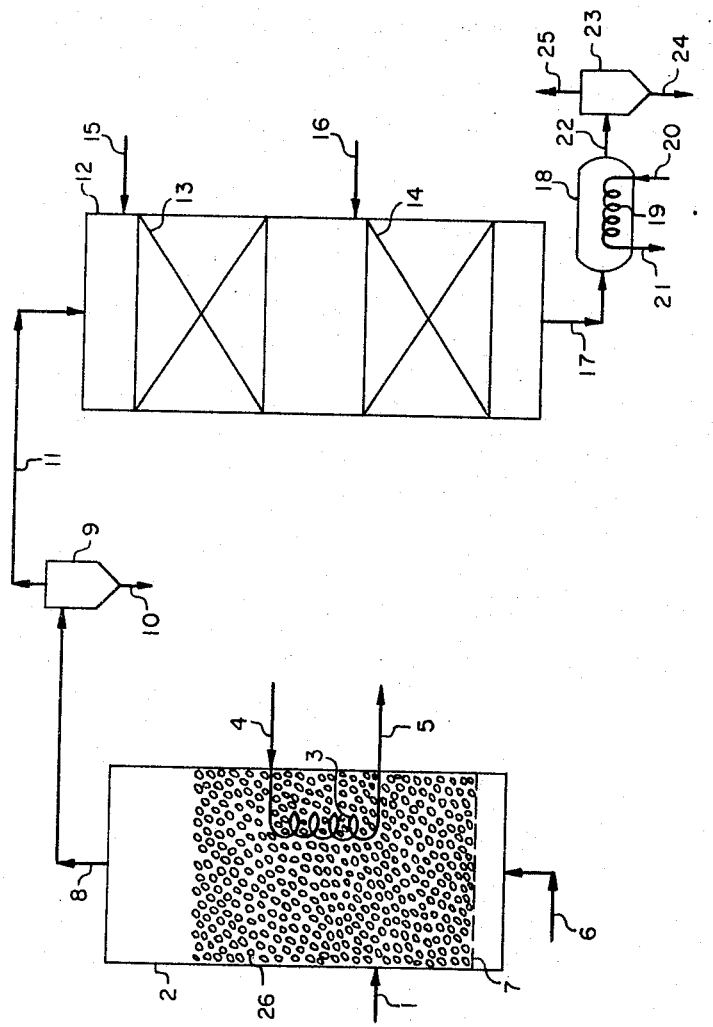
JEROME H. MARTEN
INVENTOR.
BY *J. T. Chabot*
AGENT

3,328,401
SYNTHESIS OF MELAMINE

Jerome H. Marten, East Brunswick, N.J., assignor to Chemical Construction Corporation, New York, N.Y., a corporation of Delaware
Filed May 23, 1966, Ser. No. 552,209
8 Claims. (Cl. 260—249.7)

This invention relates to the catalytic synthesis of melamine from urea, and is a continuation-in-part of U.S. patent application No. 344,102, filed Feb. 11, 1964, now U.S. Patent No. 3,290,309. An improved catalytic melamine synthesis process is provided, in which the catalytic melamine synthesis reaction is moderated and excessive temperature rise is prevented, by dispersing ammonia vapor into the inlet portion of the synthesis catalyst bed together with the intermediate process gas stream produced by vaporization of the urea feed stream.

Melamine can be produced by vaporizing molten urea, and passing the resulting process gas stream through one or several catalyst beds at elevated temperature. The urea forms melamine in accordance with the following equation:

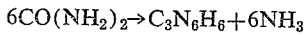

$$6CO(NH_2)_2 \rightarrow C_3N_6H_6 + 6NH_3$$

The resulting vapor stream is partially condensed by cooling, to yield crude solid melamine and a mixed ammonia-carbon dioxide off-gas.

The melamine synthesis reaction according to the equation supra is exothermic, and since the feed gas stream to the catalyst bed must be at an elevated temperature to prevent deposition of solids, there is a tendency in practice for excessive temperature rise to occur in the catalyst bed. Such excessive temperature rise is highly undesirable, due to concomitant cracking of ammonia and the formation of melamine decomposition products such as melams, which contaminate the product melamine and may also deposit in the catalyst bed or elsewhere in the process equipment as solid, horn-like deposits. The prevention of excessive temperature rise during catalytic conversion has been attained by the provision of cooling coils in the catalyst bed, however such an expedient is expensive and also fails to provide uniform cooling, and thus localized hot spots may develop in the catalyst bed in practice.

In the present invention, excessive temperature rise in the catalyst bed during melamine synthesis is prevented and the catalytic melamine synthesis reaction is moderated, by dispersing ammonia vapor, which has been preheated to a specific temperature range of from 150° C. to 300° C., into the inlet portion of the synthesis catalyst bed together with the intermediate process gas stream produced by vaporization of the urea feed steam. It has been determined that a minimum preheat temperature of 150° C. is required for the ammonia vapor, in order to prevent possible overcooling due to process surges or incomplete mixing, which could lead to the deposition of solids above or within the catalyst bed. The maximum temperature limit for the ammonia vapor of 300° C. is also important, since above 300° C. the ammonia vapor does not provide an adequate cooling effect for effective moderation of the melamine synthesis reaction and prevention of excessive temperature rise.

The principal advantage of the present invention is that excessive temperature rise during catalytic melamine synthesis is effectively prevented, and the catalyst bed is maintained at a substantially uniform temperature for optimum conversion of urea to melamine. Since the temperature level during catalytic reaction is effectively controlled, overheating of the catalyst bed with concomitant adverse effects such as cracking and loss of ammonia, degradation or decomposition of melamine to melams or other undesirable byproducts, and possible loss of the catalytic activity of the catalyst bed are effectively prevented. In addition, since the ammonia vapor is preheated to a minimum temperature of at least 150° C. before dispersal into the catalyst bed, localized overcooling of the process gas stream, with resultant premature deposition of solids in the catalyst bed or elsewhere in the apparatus system, which could result in plugging of the catalyst bed or channeling effect, is effectively prevented.

It is an object of the present invention to produce melamine from urea in an improved manner.

Another object is to effectively moderate the catalytic melamine synthesis reaction and prevent excessive temperature rise.

A further object is to cool the process gas stream during catalytic synthesis of melamine from vaporized urea, while preventing over-cooling and solids deposition.

An additional object is to usefully employ ammonia vapor as a direct coolant in catalytic melamine synthesis, so that ammonia vapor serves to moderate the catalytic reaction and prevent excessive temperature rise.

Still another object is to prevent ammonia cracking and the formation of melamine decomposition products such as melams, during catalytic synthesis of melamine from vaporized urea.

An object of the present invention is to produce melamine from urea by a more efficient catalytic process in which the temperature is controlled at an optimum level for melamine synthesis.

These and other objects and advantages of the present invention will become evident from the description which follows. Referring to the figure, a flowsheet of a preferred embodiment of the invention is presented. Urea feed stream 1 is passed into the fluid bed 26 of the fluid bed vaporizer 2. The urea stream 1 will preferably consist of molten liquid urea, however solid urea may also be employed in the process. The fluid bed 26 will preferably consist of catalytically active particles which tend to promote the in situ synthesis of melamine during urea vaporization, such as silica gel; alumina gel; activated bauxite; an inorganic phosphorus compound such as phosphoric acid or boron phosphate deposited on a suitable carrier such as alumina silica, mullite or quartz; activated alumina, or a fused mixture of solid urea, carbon black, and an inorganic phosphorus-containing compound such as phosphoric acid. In other instances, bed 26 may consist of catalytically inert material such as sand. In this case, a certain amount of in situ conversion of urea to melamine may take place due to in situ thermal effects.

The fluid bed 26 in vaporizer 2 is maintained at an elevated temperature in the range of 270° C. to 400° C. by internal heating coil 3, with heating fluid such as a molten salt being passed into coil 3 via stream 4 and discharged via stream 5. A minimum fluid bed temperature of 270° C. is desirable in order to attain usable vaporization rates, and substantial catalytic conversion of urea to melamine when bed 26 consists of a melamine synthesis catalyst. A maximum temperature of 400° C. is desirable in order to avoid decomposition of ammonia, which is also present in the fluid bed due to the melamine synthesis reaction and is also preferably present as a fluidization carrier gas, as will appear infra. An optimum operating temperature range of 310° C. to 370° C. has been found to be preferable in practice.

A carrier gas stream 6 preferably consisting of ammonia vapor is also passed into the bottom of unit 2, below particle retention screen 7. Stream 6 rises through the fluid bed 26 and acts as a fluidization medium. In addition, stream 6 preferably consists of ammonia vapor because excess ammonia is desirable during melamine synthesis from urea, in order to prevent the formation of melamine decomposition products. Thus, the weight ratio of ammonia vapor stream 6 to urea feed stream 1 will be at least 0.7:1 or higher. Under these conditions, it has been determined that optimum fluidization of the bed 26 is attained when the fluid bed particles have a particle size distribution in the range of 60 mesh to 200 mesh. In addition, the particles of catalyst bed 26 will preferably have an internal surface area in the range of 10 to 80 square meters per gram. Under these conditions, the surface of each particle in bed 26 essentially contains large pores with the exclusion of smaller pores, and is relatively hard and dense.

The fluidizing ammonia vapor stream 6 rises through the preferably catalytic fluid bed 26, and mixes with the urea vapor which is generated from urea feed stream 1 under the elevated temperature conditions maintained in the bed 26 by heating coil 3. A concomitant partial conversion of urea vapor to melamine vapor takes place in the fluid bed 26, due to thermal effects and the catalytic action of the bed particles. Under selected optimum operating conditions of elevated temperature and gas velocity through the bed, a total conversion of as much as 75% of the urea feed stream 1 to melamine is attained in the fluid bed 26.

An intermediate process gas stream 8 is withdrawn from unit 2 above the fluid bed 26, and principally contains urea, melamine, ammonia and carbon dioxide. Small amounts of melamine precursors such as biuret, cyanic acid, ammeline and ammelide may also be present in stream 8. In addition, stream 8 may contain entrained small solid particles of catalyst derived from the fluid bed 26. In order to prevent plugging of the downstream catalyst bed in which final urea conversion to melamine is is attained, and which is preferably a fixed bed, the solid particles entrained in stream 8 are removed by passing the gas stream 8 into a gas-solids separator, such as cyclonic-shaped vessel 9. Unit 9 may be provided with suitable internal baffles, not shown. In vessel 9, the solid particles component of stream 8 is separated out by gravity, and settles downward inside vessel 9 for removal as solids stream 10. Stream 10 may be directly recycled to vaporizer unit 2 to form a component of bed 26, or stream 10 may be suitably compacted as by briquetting prior to recycle to bed 26.

The residual gas phase, now free of entrained solid particles, leaves vessel 9 via stream 11. The intermediate process gas stream 11 now passes into catalytic converter 12, in which complete conversion of urea and melamine precursors into melamine is attained. Converter 12 is provided with upper melamine synthesis catalyst bed 13 and lower melamine synthesis catalyst bed 14, which are arranged in series and preferably consist of fixed catalyst beds. When the fluid bed 26 in unit 2 consists of melamine synthesis catalyst, the catalyst in beds 13 and 14 will preferably be identical with the catalytic material of the fluid bed 26, however different catalyst compositions may be employed in beds 13 and 14 from that provided in unit 2. In any case, the catalytic material of fixed beds 13 and 14 will consist of a suitable melamine synthesis catalyst, such as one of the catalytic materials and compositions described supra.

The mixed gas stream 11 passes downwards in series through beds 13 and 14, and the melamine precursors and residual urea vapor content of stream 11 are substantially completely converted to melamine under the process conditions maintained in unit 12. Ammonia vapor streams 15 and 16, which are at a temperature in the range of 150° C. to 300° C. as described supra, are added to the main process gas stream immediately above the fixed beds 13 and 14 respectively, so that the ammonia vapor streams 15 and 16 are dispersed into the inlet portions of the respective catalyst beds together with the process gas stream. A preferable operating temperature of below 260° C. and in the range of 150° C. to 260° C. will be provided for ammonia vapor streams 15 and 16 in practice, to permit optimum operation while allowing for temperature fluctuations due to possible process upsets. As described supra, addition of ammonia vapor streams 15 and 16 at the upper surfaces of beds 13 and 14 respectively serves to moderate the exothermic melamine synthesis reaction, thus providing essentially isothermal operation and avoiding excessive temperature rises in the upper portions of the fixed beds which could lead to ammonia decomposition or the formation of melamine decomposition products such as melams. Process operating temperature in beds 13 and 14 is thus maintained in the range of 310° C. to 400° C., since below 310° C. less complete conversion of urea to melamine is attained and above 400° C. some decomposition of ammonia and melamine may occur. A preferable operating temperature range of 340° C. to 370° C. will be maintained in beds 13 and 14 in practice, to permit optimum operation while allowing for temperature fluctuations due to possible process upsets.

The fully converted process gas stream 17 now leaves vessel 12 below lower bed 14, and contains principally melamine vapor, ammonia and carbon dioxide. In some cases, unreacted urea vapor and the melamine precursors mentioned supra may be present in stream 17 in very small amounts. The mixed gas stream 17 passes to gas cooler-condenser 18, in which the gas stream is cooled to a final temperature below 320° C. which is the sublimation point of solid melamine. Unit 18 is schematically shown as being provided with cooling coil 19, through which a cooling fluid is passed via inlet stream 20, with warmed fluid being removed via outlet stream 21. The resulting cooled gas stream 22, now at a temperature below 320° C., contains crude solid melamine entrained in the residual gas phase. Stream 22 now passes to gas-solids separator 23, which is typically a cyclonic-shaped unit provided with internal baffles, not shown. The solids component of stream 22, consisting of crude solid melamine, settles by gravity flow to the bottom of unit 23 and is removed to product utilization as stream 24. The residual off-gas phase consisting of a mixture of ammonia and carbon dioxide is withdrawn from unit 23 via stream 25, and is passed to further utilization. Off-gas stream 25 may be reacted with nitric acid, not shown, to produce by-product ammonium nitrate. Alternatively, stream 25 may be utilized in urea synthesis, as described in U.S. patent application No. 264,637 filed Mar. 12, 1963, and now issued as U.S. Patent No. 3,239,522.

Numerous alternatives within the scope of the present invention will occur to those skilled in the art. Thus, the ranges of process variables such as temperature ranges enumerated supra constitute merely preferable ranges for optimum utilization of the process concepts of the present invention, and the process is also operable outside of these ranges in practice, with the exception of the temperature range of the ammonia vapor streams 15 and 16.

The fixed bed final catalytic conversion of urea to melamine is shown as taking place in the two fixed beds 13 and 14. Alternatively, this conversion may be carried out in a single fixed catalyst bed, however temperature control by ammonia vapor injection is more difficult in this case, because of the greater bed depth which is required. It will be evident that more than two fixed beds may also be employed, with apparatus capital cost being a limiting factor in practice. In addition, it should be noted that beds 13 and 14 may alternatively consist of fluid beds similar to bed 26 of unit 2. In this case, stream 11 would be admitted to unit 12 below lower bed 14, stream 17 would be withdrawn from unit 12 above upper bed 13, and ammonia vapor streams 15 and 16 would be admitted into unit 12 below beds 13 and 14 respectively.

The recovery of melamine from the product gas stream 17 may alternatively be carried out by the use of other known procedures, such as by the use of a direct contact aqueous quench liquid wash. One procedure of this nature is described in U.S. patent application No. 344,020, filed Feb. 11, 1964 and now U.S. Patent No. 3,290,308. In this case, stream 24 would consist of a slurry of solid melamine in aqueous quench liquor, with recovery of solid product melamine taking place by filtration, centrifuging, or other conventional means.

Urea feed stream 1 may be vaporized by other known means, besides the fluid bed vaporizer 2. Thus, intermediate process gas stream 11 may be produced by direct heating of molten urea, such as described in U.S. patent application No. 344,020 mentioned supra. In this case, stream 11 will contain only a minor proportion of melamine, and will consist principally of vaporized urea, together with minor proportions of urea decomposition products and melamine precursors such as cyanic acid, biuret, ammeline, ammelide, ammonia and carbon dioxide. The heat exchange coil 3 provided for maintenance of elevated temperature in the fluid bed 26 of unit 2 may alternatively be replaced by an electric resistor heating element or other suitable heating means known to the art.

It will be apparent that other melamine precursors such as biuret, cyanic acid and cyanuric acid may also be employed as the process feed stream 1, or as stream 11 in instances when these precursors are available in the vapor state and at proper temperature. Thus, it will be understood that such other melamine precursors are functionally equivalent to a urea feed stream in the process of the present invention, and therefore that the process of the present invention is not limited to the use of urea as a feed material, but rather that the other melamine precursors mentioned supra are contemplated as suitable equivalent feed materials to the process within the scope of the present invention. Typical procedures for the synthesis of melamine from cyanic acid include Canadian Patents Nos. 697,799 and 665,806.

An example of practical application of the process of the present invention will now be described.

*Example*

The process of the present invention was applied to a pilot plant two bed melamine synthesis reactor. All gas stream compositions infra are given in mols/hour of the individual components.

Gas stream 11 was passed to the two bed reactor from the vaporizer at a temperature of 400° C. Stream 11 contained 47.4 mols/hour ammonia, 3.0 carbon dioxide, 7.2 cyanic acid and 1.0 melamine. Ammonia vapor at 177° C. was added immediately prior to each catalyst bed, resulting in an exit gas composition of 82.7 ammonia, 6.0 carbon dioxide, 1.1 cyanic acid and 2.0 melamine. This exit product gas stream was equivalent to an overall conversion of feed urea to melamine of 91%, with no ammonia decomposition and no formation of melamine decomposition products.

When no cooling of the catalyst beds was provided, no net conversion to melamine takes place but a temperature of 500° C. is reached with resultant decomposition of ammonia to nitrogen and hydrogen, and decomposition of melamine to melams and other decomposition products. Subsequently, complete loss of catalyst activity took place.

I claim:
1. In a process for the synthesis of melamine from urea in which urea is vaporized by heating to form an intermediate process gas stream at elevated temperature, said intermediate process gas stream is passed through a catalyst bed to synthesize melamine, the resulting product gas stream comprising melamine, ammonia and carbon dioxide is withdrawn from said catalyst bed and cooled to condense solid melamine, and product solid melamine is separated from residual mixed off-gas comprising ammonia and carbon dioxide, the improvement which comprises dispersing ammonia vapor at a temperature in the range of 150° C. to 300° C. into the inlet portion of said catalyst bed together with said intermediate process gas stream, whereby the catalytic melamine synthesis reaction is moderated and excessive temperature rise is prevented.

2. The process of claim 1, in which said catalyst bed is divided into first and second sections in series, a first stream of ammonia vapor at a temperature in the range of 150° C. to 300° C. is dispersed into the inlet portion of said first section of said catalyst bed, and a second stream of ammonia vapor at a temperature in the range of 150° C. to 300° C. is dispersed into the inlet portion of said second section of said catalyst bed.

3. The process of claim 1, in which said catalyst bed is maintained at a temperature in the range of 340° C. to 370° C. by said dispersing of ammonia vapor into the inlet portion of said bed.

4. The process of claim 1, in which urea is vaporized by passing a urea feed stream into a heated fluid bed, said fluid bed being fluidized by the injection of a carrier gas below said fluid bed, whereby said carrier gas forms a component of said intermediate process gas stream.

5. The process of claim 4, in which said carrier gas is ammonia.

6. The process of claim 4, in which said fluid bed comprises a melamine synthesis catalyst, whereby said intermediate process gas stream contains melamine.

7. The process of claim 4, in which said fluid bed is heated to a temperature in the range of 270° C. to 400° C.

8. The process of claim 1, in which said catalyst bed is a fixed bed, said intermediate process gas stream is passed downwards through said bed, and said ammonia vapor is dispersed into the upper portion of said fixed bed together with said intermediate process gas stream.

References Cited

UNITED STATES PATENTS

| 3,093,644 | 6/1963 | Steggerda | 260—249.7 |
| 3,095,416 | 6/1963 | Crowley et al. | 260—249.7 |
| 3,300,493 | 1/1967 | Hamprecht et al. | 260—249.7 |

WALTER A. MODANCE, *Primary Examiner.*

J. M. FORD, *Assistant Examiner.*